United States Patent [19]

Harned et al.

[11] Patent Number: 4,772,815
[45] Date of Patent: Sep. 20, 1988

[54] VARIABLE RELUCTANCE POSITION TRANSDUCER

[75] Inventors: Timothy J. Harned, East Kingston; Steven R. Huard, Litchfield; David M. Lancisi, Dover, all of N.H.; Joseph S. Pavlat, Petaluma, Calif.; Charles K. Taft, Durham, N.H.

[73] Assignees: Eastern Air Devices, Inc., Dover, N.H.; Parker Hannifin Corporation, Cleveland, Ohio

[21] Appl. No.: 96,522

[22] Filed: Sep. 15, 1987

[51] Int. Cl.⁴ .................. H02K 3/16; H02P 6/02
[52] U.S. Cl. .................. 310/171; 310/68 R; 310/186; 318/661
[58] Field of Search .......... 310/68 B, 49 R, 113, 310/114, 162, 168, 268, 171, 68 R, 186, 263; 318/661, 718, 721, 724; 340/347 SY

[56] References Cited

U.S. PATENT DOCUMENTS

| | | | |
|---|---|---|---|
| 2,589,999 | 3/1952 | Feiertag et al. | 310/156 |
| 2,982,872 | 5/1961 | Fredrickson | 310/163 |
| 3,535,604 | 10/1970 | Madsen et al. | 318/138 |
| 4,267,497 | 5/1981 | Cannon | 318/661 |
| 4,489,266 | 12/1984 | Franzolini | 318/800 |
| 4,551,708 | 11/1985 | Welburn | 318/661 |
| 4,687,961 | 8/1987 | Horber | 310/186 |

Primary Examiner—Patrick R. Salce
Assistant Examiner—D. L. Rebsch
Attorney, Agent, or Firm—Lahive & Cockfield

[57] ABSTRACT

A rotational position transducer comprising a rotor having annularly spaced teeth and a stator with a pole face configuration comprising annularly spaced teeth opposing the rotor teeth. One or more pole windings are energized by an alternate current source, and one or more output voltages induced in pole windings are produced with components having a characteristic which varies as a function of the angular position of the rotor relative to the stator. The output voltages may be either amplitude or phase modulated as a function of rotor position. The transducer may be combined with a stepping motor having an identical pole configuration.

7 Claims, 4 Drawing Sheets

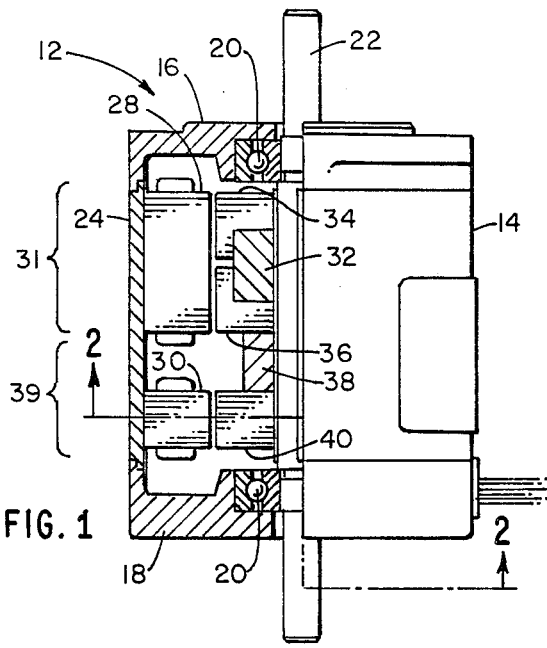
FIG. 1
FIG. 2
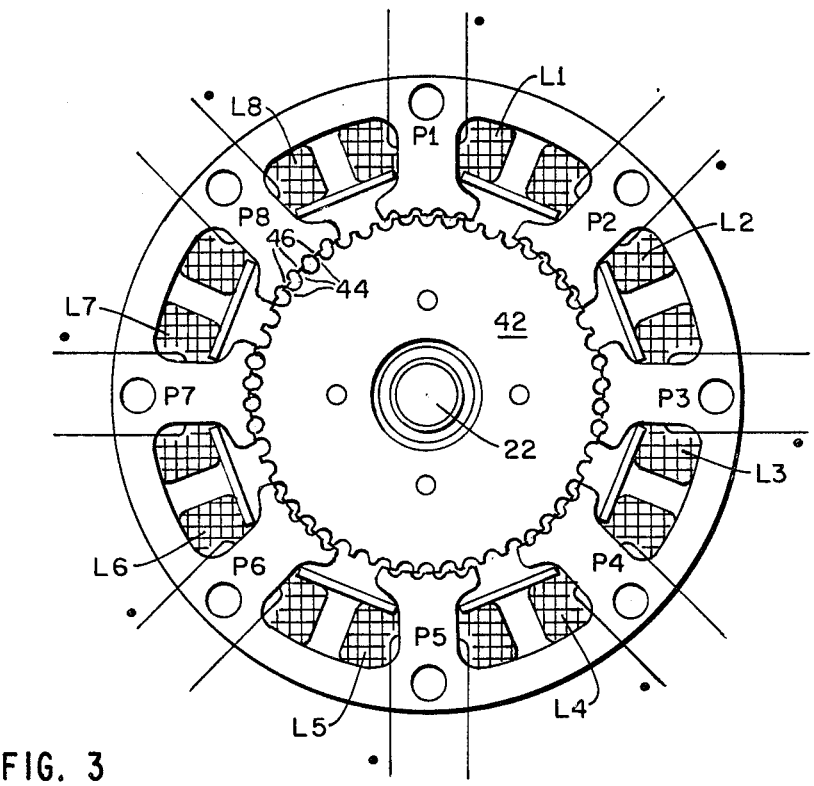
FIG. 3

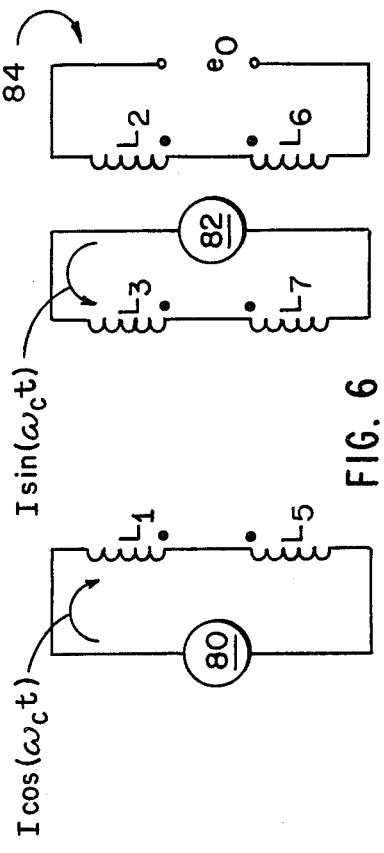
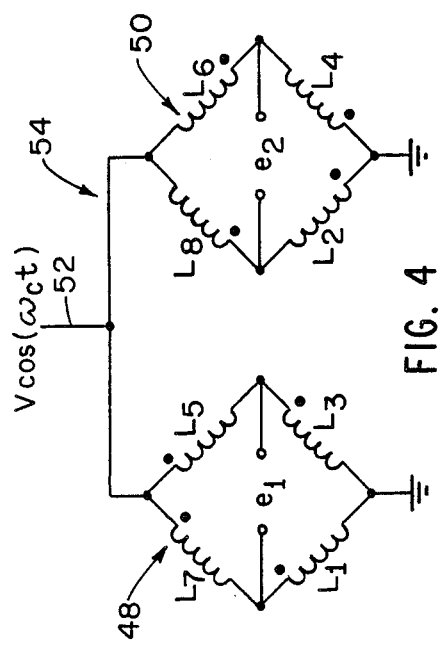
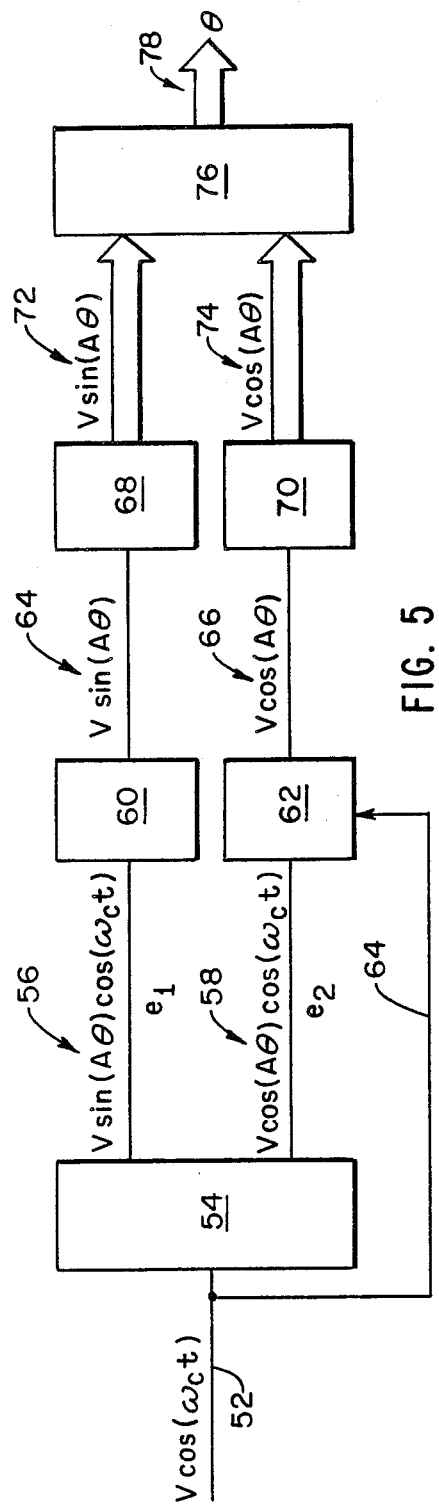

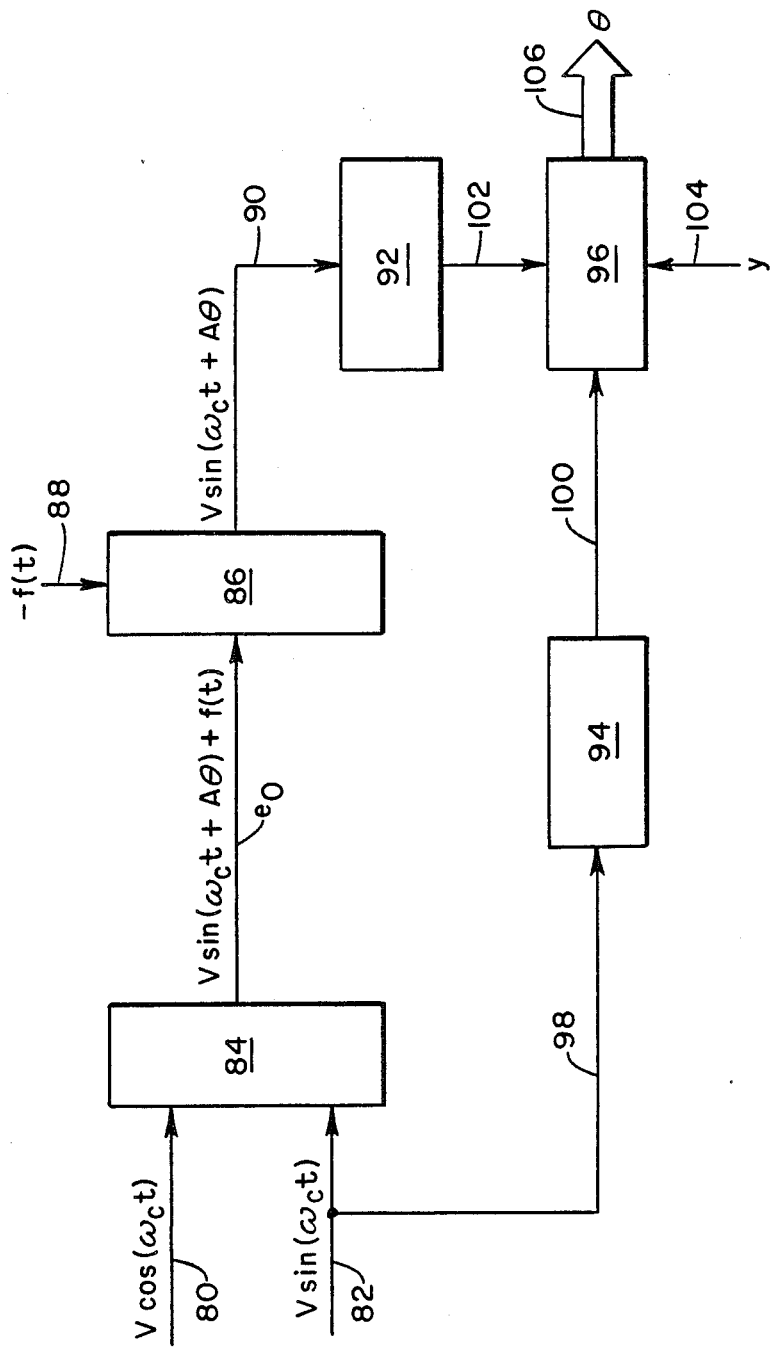

VARIABLE RELUCTANCE POSITION TRANSDUCER

SUMMARY OF THE INVENTION

This invention relates generally to position transducers for indicating the angular position of rotating members, for example stepping motors for motion control in industrial applications. More particularly, the invention relates to apparatus for attachment to a driver, for example the shaft of a stepping motor, and adapted to produce an electrical output signal or signals having one or more characteristics that vary with the angular position of the driver, thus permitting an accurate measurement of position.

Stepping motors of the general types described in U.S. Pat. Nos. 2,589,999 to Feiertag et al, 2,982,872 to Fredrickson and 3,343,014 to Giles are presently in wide use for control of motions in industrial and other machine elements. Although the present invention has potential applications beyond its use in conjunction with such motors, they serve to typify the state of the art, and in particular the problems and limitations that have arisen in obtaining and using precise measurements of angular position under working conditions.

Stepping motors of the foregoing type include, in general, a rotor having a permanent magnet with its polar axis oriented axially of the shaft and for each pole of the magnet a corresponding rotor pole piece with annularly spaced teeth. They also include a stator which has poles formed with pole faces also having annularly spaced teeth opposing the teeth on the rotor pole pieces. Such motors are generally called hybrid motors, possessing elements of both variable reluctance motors and permanent magnet motors. With suitable energization of the stator windings, the motor may be caused to advance in one or more steps. With a rotor having "n" teeth, the tooth pitch is $2\pi/n$ and the angular magnitude of a step equals the tooth pitch divided by the number of phases on the stator windings. For example, if there are 50 rotor teeth and four phases, each step equals $\pi/100$ or 1.8 degrees. There are two basic modes of actuation. The first is the full or half step mode in which the motor is stepped in angular increments equal to the angle subtended by a single rotor tooth and one adjacent tooth space, or half of such angle. The second mode is known as microstepping, wherein the motor does not step in such increments but the stator windings are energized by sinusoidal and cosinusoidal currents in phase quadrature. These currents cause the magnetic field within the motor to sweep smoothly, rather than to step by discrete angular steps. At low speeds, microstepping permits the motor to operate smoothly, with virtual insensitivity to resonance problems, and with the ability to provide displacements at positions anywhere between zero and the full step position.

With either mode of energization, it is often necessary to provide an accurate measurement and indication of the actual angular displacement of the motor, either for direct indication or as part of a feedback system. Difficulties have arisen with previously used position sensing means such as optical encoders, Hall effect devices and magnetoresistive devices. In such devices errors in the accuracy of the indications of absolute position result from one or more of several causes. Such causes include shaft eccentricity over 360 degrees, low inherent resolution, noise which may introduce a permanent error in the position indication, and sensitivity of the device to the temperature of the working environment, typically where the stepping motor is operated at elevated or variable temperatures.

A principal object of this invention is to provide a transducer for accurate and reliable angular position data without the introduction of errors arising from the above or other causes encountered in the prior art position sensing transducers, thus improving accuracy and repeatability of performance.

A second object is to provide a position sensing transducer that is relatively inexpensive to produce, and in particular a transducer that comprises the same materials and structural configurations that are used in the manufacture of the stepping motors themselves.

A third object is to provide a transducer that is reliably operable under the same conditions as the stepping motor, and in particular a transducer that is insensitive to the temperature extremes or variations created by the motor in operation. Preferably, it is desired to provide a transducer that may be fitted within the same housing as the stepping motor, and may become a structurally integral part of the motor, thus conserving space.

A fourth object is to provide a transducer that adds only a small amount of inertia to that of the stepping motor itself.

A fifth object is to provide a transducer that does not include brushes or other wearing parts, thus reducing maintenance costs.

A sixth object is to provide a transducer that is adapted for operation in both digital and analog feedback systems that are employed in stepping motor controls.

Having in view the foregoing and other objects hereinafter appearing, this invention comprises a variable reluctance rotational position transducer including a rotor of magnetic material having annularly spaced teeth and means for rigid attachment to a rotating driver such as the shaft of a stepping motor, and a stator having a pole configuration with a face comprising a plurality of annularly spaced teeth opposing the rotor teeth. An alternating carrier voltage or voltages are supplied to one or more pole windings, which induce voltages in pole windings having components that vary as a function of rotor position. The output voltage or voltages may be applied to various types of circuitry for detection and conversion into corresponding indicia of position.

The output voltages so induced arise from the variations in reluctance of the magnetic paths through the windings on the stator poles. Variations occur in the self inductance of the magnetic paths through the energized pole windings; and variations also occur in the mutual inductance of magnetic paths linking the windings of different poles, particularly poles that are adjacent in the stator structure.

The induced voltages arising from the variations in the reluctance result directly from the changing alignment of the rotor teeth relative to the stator teeth, and such variations pass through a complete cycle with each angular rotation equal to one rotor tooth pitch. The output voltages induced by these reluctance changes have multiple components, and depending upon the particular configuration of the windings and mode of energization the useful components may be either amplitude or phase modulated by a function of angular position. The modulated components may then be demodulated to obtain the position data as a useful output.

Other features of the invention will be appreciated from the following description of the preferred and alternative embodiments, having reference to the appended drawings.

DRAWING

FIG. 1 is an elevation partly in section illustrating a presently preferred embodiment of the invention in which the position transducer is incorporated in a housing with a hybrid stepping motor.

FIG. 2 is an elevation taken on line 2—2 of FIG. 1.

FIG. 3 is an enlarged elevation on a plane perpendicular to the motor axis similar to FIG. 2, showing all of the stator poles of the transducer.

FIG. 4 is a circuit diagram of the pole winding connections corresponding to the numbered poles in FIG. 3, producing output voltages that are amplitude modulated as a function of rotor position.

FIG. 5 is a block diagram showing circuitry for converting the output voltages of FIG. 4 to a useful digital position output.

FIG. 6 is a circuit diagram showing first alternative connections to the poles numbered as in FIG. 3, for producing an output voltage that is phase modulated as a function of rotor position.

FIG. 8 is a block diagram showing circuitry for converting the output voltage of FIG. 6 or FIG. 7 to a useful digital position output.

DETAILED DESCRIPTION

Figure 7:
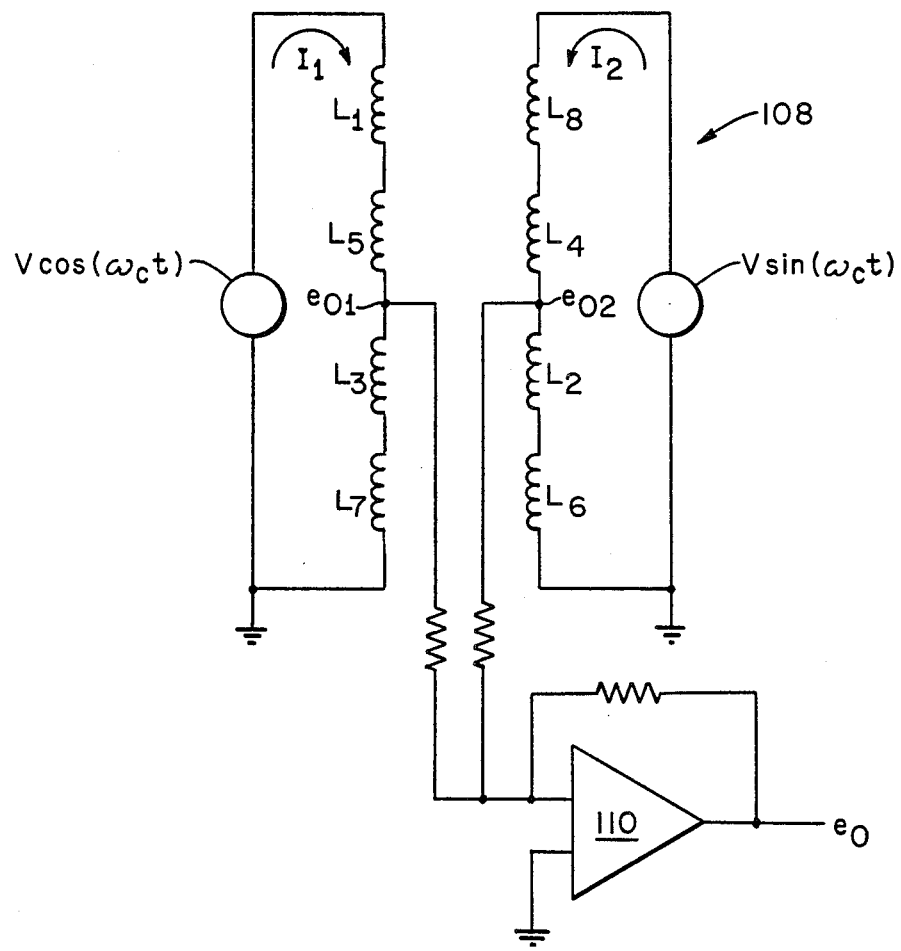
FIG. 7 is a circuit diagram showing second alternative connections to the poles numbered as in FIG. 3, for producing an output voltage that is phase modulated as a function of rotor position.

Referring to FIGS. 1 to 3, a hybrid stepping motor with an integral position transducer according to this invention is shown generally at 12. The motor has a housing 14 of conventional construction including ends 16 and 18, each having bearings 20 for a shaft 22. The housing ends are respectively secured to a housing sleeve 24 of cylindrical shape.

Two sets of stator laminations 26 of magnetic material are securely fitted in spaced relation within the sleeve 24, namely, a motor stator set 28 and a transducer stator set 30. Preferably, the laminations of the stator set 30 are identical to those of the stator set 28, as to both the materials of construction and the configurations of the laminations as fully shown in FIG. 3. Thus the reference numeral 26 applies equally to the laminations in each set. Each lamination 26 is an integral sheet of iron comprising an outer ring and a portion forming each of the transducer poles P1 to P8, or corresponding stator poles of the motor.

Referring first to the stator set 28, this set defines the poles of a hybrid, four phase, eight pole stepping motor 31 which, aside from the position transducer described below, is of conventional construction. The motor 31 includes a cylindrical permanent magnet 32 polarized axially of the shaft 22 and coaxially secured to the shaft with rotor pole pieces 34 and 36. The pole pieces 34 and 36 are of laminated construction and formed of magnetic material with annularly spaced teeth. Opposing these teeth are the toothed faces of the poles of the stator set 28. The forms of the rotor and stator teeth, as well as their angular spacings and mutual relationships may be chosen in accordance with any of the prior art teachings relating to stepping motor design. For simplicity, the motor pole windings and connections thereof to a source of electrical current have been omitted from the drawing as they form no part of the present invention. It suffices to say that the energization of these pole windings, whether in the full or half step mode or by means of sinusoidal and cosinusoidal currents, results in the angular rotation of the shaft 22 by multiples of the pitch of the teeth on the rotor pole pieces 34 and 36. Reference is made to the above-identified patents for a detailed description of the stepping motor operation.

A cylindrical spacer 38, preferably of nonmagnetic material, separates the rotor pole piece 36 from a variable reluctance transducer 39 having a rotor 40 comprising a set of identical circular laminations 42 (FIG. 3). The laminations 42 are formed with a plurality of annularly spaced teeth 44. Preferably, the teeth 44 are identical in number and annular spacing to the teeth on the rotor pole pieces 34 and 36. The laminations 42 may be identical, as to both tooth shape and materials of construction, to those laminations of the pole pieces 34 and 36 that extend beyond the ends of the magnet 32. The use of identical laminations in constructing the motor and the transducer results in substantial economy of manufacturing cost. The rotor 40 is secured on the shaft 22 peferably in the same manner as the rotor pole pieces 34 and 36.

The stator set 30 of the transducer 39 defines, in this embodiment, eight poles P1 to P8, having corresponding pole windings L1 to L8. Each stator pole is formed with stator pole teeth 46 that are preferably identical to the pole teeth on the stator set 28 of the stepping motor 31. Thus the opposing rotor teeth 44 and stator pole teeth 46 have the same alignment and mutual relationships as do a rotor pole piece and the stator teeth of the stepping motor.

In this preferred embodiment, a four-phase, eight pole stepping motor 31 is described as an example, the rotor having 50 teeth. The locations of the stator pole teeth are preferably chosen so that, for the particular shaft position illustrated in FIG. 3, the rotor and stator teeth of the poles P3 and P7 are exactly aligned, while those of the poles P1 and P5 are exactly out of alignment. For the same rotor position and assuming a clockwise direction of rotation, the rotor teeth opposing the poles P2 and P6 are advanced relative to the opposing stator pole teeth by one-fourth tooth pitch, while the rotor teeth opposing the poles P4 and P8 are advanced relative to the opposing teeth of those poles by three-fourths tooth pitch.

Therefore, for the above-stated rotor position, the magnetic reluctance across the air gaps of the teeth of the poles P3 and P7 is at a minimum value and the inductance of the windings of those poles is at a maximum value. Conversely, the reluctance of the air gaps across the teeth of the poles P1 and P5 is at a maximum value and the inductance of the windings of those poles is at a minimum value. On the other hand, the magnetic reluctance of each of the air gaps of the poles L2, L4, L6 and L8 is the same for the illustrated position of FIG. 3, and is intermediate between the maximum and minimum values. Thus the inductances of the windings of those poles are of equal value.

The pole windings L1 to L8 for the corresponding numbered transducer poles P1 to P8 are preferably formed and assembled on the poles in the same manner as the windings of the stepping motor poles as described above.

According to a first embodiment of the invention, the windings L1 to L8 are connected to form sensor bridge circuits 48 and 50 as shown in FIG. 4. The bridge circuits are both connected by a lead 52 with a source of sinusoidal carrier alternating voltage of amplitude "V" and frequency "f," the instantaneous value of this voltage being expressed by $V\cos\omega_c t$, where "$\omega_c$" equals $2\pi$ times the frequency "f" of the carrier voltage and "t" represents time. The output voltage of the bridge circuit 48 is represented as "$e_1$", and that of the bridge circuit 50 as "$e_2$".

The operation of the circuit of FIG. 4 may be explained by first considering the assumed rotor position of FIG. 3 and taking into account, for purposes of simplification, only the changes in self inductance of the pole windings as described above. The inductances L3 and L7 being at maximum value and the inductances L1 and L5 at minimum value, the bridge output voltage $e_1$ is at a maximum amplitude. Conversely, in this rotor position the inductances L2, L4, L6 and L8 are all of equal value and the bridge output voltage $e_2$ is theoretically at zero amplitude.

As the rotor advances through one complete tooth pitch, the inductance values in the bridge circuits each change in a complete cycle. Preferably, the carrier frequency "f" is chosen to have a period that is very short relative to the time duration of one tooth pitch of rotor movement, whereby the voltages $e_1$ and $e_2$ are amplitude modulated sinusoidal shaped wave forms in quadrature with one another, i.e. 90 electrical degrees shifted in phase, with each cycle of modulation corresponding to a rotor movement of one tooth pitch.

FIG. 5 represents a typical arrangement for employing the output voltages $e_1$ and $e_2$ to obtain a useful digital position output. The carrier frequency voltage on the lead 52 is connected with the transducer bridge circuits of FIG. 4, schematically represented at 54. The output voltages $e_1$ and $e_2$ of the bridge circuits are respectively represented at 56 and 58 as amplitude modulated wave forms. The amplitudes of the modulations vary respectively as the sine and cosine of "$A\theta$", where "A" equals the number of teeth on the rotor and "$\theta$" equals the angle of rotation of the rotor. Thus there are "A" complete cycles of modulation in each full revolution of the rotor.

The voltages $e_1$ and $e_2$ are then decoded into digital binary position information which can be used to indicate or display rotational position, or to control the torque, velocity or position of a motor attached to the transducer. First, these voltages are separately and synchronously demodulated in circuits 60 and 62 using the original carrier signal on the lead 52, by means of a connection 64. This demodulation serves to remove the carrier frequency "f" from the sensor circuits output. The circuits 60 and 62 are of a known type that operate by sampling the voltages $e_1$ and $e_2$ when they are at maximum amplitude with the term $\cos(\omega_c t)$ at its peak value of "1." This sampling produces signals at 64 and 66 having the values $V\sin(A\theta)$ and $V\cos(A\theta)$. These signals are then connected to analog-to-digital converters 68 and 70, each adapted to represent the magnitude of its input voltage in a binary form having "m" bits, the value of "m" being selected to provide the desired resolution. The outputs of the converters, shown at 72 and 74, are represented by solid arrows to indicate that they are of digital form.

The binary signals at 72 and 74 are applied to a digital, addressable memory array 76 having 2 m address bits. The array includes a memory cell for each of the possible combinations of values for the signal 72 and the signal 74. Thus there are $2^{2m}$ memory cells. Each of the memory cells has "n" binary bits permanently stored therein that represent in digital form the angle "$\theta$" corresponding to the input values to that cell. Thus a particular value of $\theta$ appears at the output 78, with "n" bits of resolution. By this means, $2^n$ distinct positions can be determined for each transducer pole. For a transducer having "P" poles a total of $P(2^n)$ positions can be determined per revolution of the transducer.

In practice, the operation of the bridge circuit of FIG. 4 is complicated by the fact that the rotor movement varies not only the self inductance of the pole windings, but also the mutual inductance between the windings. This results from the fact that each lamination of magnetic material, typically iron, passes through each of the windings. Although there is mutual coupling between each winding and every other winding, in practice it is usually necessary to consider only the coupling between any particular winding and the next adjacent windings. Also, the assembled transducer may not have perfect magnetic symmetry, thus causing a variation in the mutual inductances with the angle of rotation. An analysis of the bridge output voltages $e_1$ and $e_2$ that takes into account the mutual inductances shows that they have, in addition to the terms shown in FIG. 5, additional terms which are amplitude modulated sine and cosine waves having amplitudes proportional to the ratio $As/\omega_c$, where "s" is the angular speed $d\theta/dt$ of the rotor.

In order to reduce the sensitivity of the transducer to temperature variations, it is preferred that the inductive voltage drop across each winding be much larger than the resistive voltage drop.

The output connections of the bridge circuits 48 and 50 are preferably connected to amplitude demodulation electronics 60 and 62 having a high impedance, thus reducing the magnitudes of the currents flowing through the output circuits. This will reduce the effect of such currents upon the output voltages $e_1$ and $e_2$.

Since the output voltages $e_1$ and $e_2$ are propotional to "V", it will be apparent that a low frequency variation or drift in the amplitude of the input carrier voltage on the lead 52 will produce a proportional change in the amplitudes of the output voltages. Therefore, particularly with analog feedback applications, it is desirable for the supplied input carrier voltage to have good regulation.

FIGS. 6 to 8 illustrate two alternative schemes for energizing the stator windings of FIG. 3 to produce an output voltage that is phase modulated as a function of rotor position. In the simpler scheme of FIG. 6, a source 80 produces a sinusoidal varying current through the diametrically opposite windings L1 and L5. Similarly, a source 82 produces a sinusoidal varying current 90° out of phase therewith, passing through the windings L3 and L7. In this case, because of the flux paths linking adjacent windings, output voltages are produced across the windings L2 and L6. Specifically, there is mutual inductance between the windings L1 and L2 and between the windings L3 and L2 because the windings of each of these pairs are adjacent to one another. The voltage across the winding L2 has a characteristic that is a function of the angular position of the rotor which affects the mutual inductance of this winding with each of the windings L1 and L3. It has been found that the voltage across the winding L2 can be expressed as the sum of sinusoidal varying components or terms, one of such terms having a phase angle with respect to the currents produced by the sources 80 and 82 that is dependent on the rotor position.

For like reasons, the voltage on the winding L6 has a term having a phase angle with respect to the currents produced by the sources 80 and 82 that is dependent on the rotor position, such voltage being additive and in phase with the voltage on the winding L2. Together, these voltages produce an output voltage $e_0$ having the indicated phase angle to the applied currents. In fact, either of the winding sets L1, L3, L2 or L5, L7, L6 could be used without the other to produce a useful phase modulated output.

In addition to the phase modulated component of the output voltage $e_0$, there is also an induced voltage component having a constant amplitude and phase. As this component is not useful, it may be subtracted by an operational amplifier summing junction. Then, the resulting output voltage $e_0$ is simply a phase modulated sinusoidal voltage.

FIG. 8 illustrates a scheme for converting the output voltage $e_0$ of FIG. 6 to a useful digital position output. The winding connections of FIG. 6 are schematically illustrated at 84. The output signal $e_0$ is represented by the following equation:

$$e_0 = V\sin(\omega_c t + A\theta) + f(t) \tag{1}$$

where $f(t)$ is a term of constant amplitude and phase. A circuit 86 operates to subtract this term by applying the inverse function "$-f(t)$" at 88. The output at 90 is therefore a time varying voltage of the same frequency and amplitude as the source 82, but with a phase shift relative thereto that is position dependent.

Circuits 92, 94 and 96 process the signals at 90 and a connection 98 from the source 82 to produce a binary position output. This is accomplished by measuring the phase angle between these two signals as further described below.

The circuit 94 is a zero-crossing detector that produces a digital output 100 when the signal at 98 has a null value with a positive slope. This occurs when "$\omega_c t$" is a multiple of "$2\pi$". The signal 100 is periodic with a frequency "$1/(\omega_c t)$".

The circuit 92 is also a zero-crossing detector, similar in function to the circuit 94. The circuit 92 processes the signal at 90 to produce a signal at 102 when the signal at 90 has a null value with a positive slope, this signal also having a frequency "$1/(\omega_c t)$", but which is phase shifted with respect to the signal at 100 by an angle proportional to the shaft position.

The circuit 96 is a gated, binary counter which, when enabled, counts at a frequency "y" by means of a suitable source connected at 104. The enabling and disabling of this counter is controlled by the signals at 100 and 102, whereby the signal at 100 causes the counter to reset and begin counting, and the signal at 102 disables the counting. In this manner, the zero-cross of the signal applied by the source 82 causes the counter to start counting and the zero-cross of the signal at 90, which occurs at a position dependent time, causes the counter to stop counting. When the counter has stopped counting, the contents of the counter are available at an output 106 in binary form comprising any selected number of bits, representing the phase shift and therefore the position of the transducer.

FIG. 7 illustrates a second alternative circuit 108, which may be substituted for the circuit 84 of FIG. 6 for generating the signal $e_0$. In this scheme all of the pole windings of the transducer are employed. The windings are connected in such manner that all of the varying inductances that would tend to produce unwanted terms in the voltage $e_0$ are mutually canceled. In particular, the pole windings are placed in the circuit so that the angular variation terms will cancel each other as the rotor is turned. For example, comparing the pole configuration shown in FIG. 3 with the connections of FIG. 7, it is seen that the self-inductances of the pole windings L1 and L5 are 180° out of phase with the self inductances of the windings L3 and L7. Therefore, the sum of the self-inductances of all four of these windings will be simply a DC level. As far as the mutual inductances of the pole windings are concerned, the arrangement of the connection polarities allows for all of the mutual terms to cancel out, including the DC level terms. This also applies to the speed dependent terms.

For purposes of analysis, it may be assumed that all of the pole windings have identical resistance and inductance characteristics. Thus "R" may be defined as the resistance of each pole winding. Since the inductance of each winding varies periodically as a function of rotor angle, the self inductance can be expressed as a constant value "$L_0$" and a fundamental varying with the rotor angle. Then, it can be shown that the currents $I_1$ and $I_2$ in the circuits of FIG. 7 may be represented by the following expressions.

$$I_1 = \frac{V\cos(\omega t)}{(4L_0)S + 4R} \tag{2}$$

$$I_2 = \frac{V\sin(\omega t)}{(4L_0)S + 4R} \tag{3}$$

where "S" is the Laplace operator. These expressions may be further simplified, if it is assumed that the total inductive reactance in each circuit is much greater than the total resistance, to the following expressions.

$$I_1 = \frac{V\sin(\omega t)}{4L_0\omega} \tag{4}$$

$$I_2 = \frac{-V\cos(\omega t)}{4L_0\omega} \tag{5}$$

Expressions can then be derived for signals "$e_{01}$" and "$e_{02}$". These signals are connected as inputs to an operational amplifier summing junction 110 which produces an AC signal $e_0$ having a phase proportional to the rotor angle.

It will be evident from the above description that the present invention provides an economical and highly accurate transducer suitable for use in the feedback loop of a stepping motor system. The transducer gives precise position information within one tooth pitch or step of the motor, so that a small amount of noise will not introduce any permanent error in the position.

A transducer constructed according to the present invention is relatively inexpensive, since it is constructed mainly from copper and iron and made from the same rotor and stator laminations as the stepping motor. Therefore, no new or different technology is required by the motor manufacturer in producing the transducer, and the same manufacturing equipment may be used for the transducer as that employed for the stepping motor.

The transducer can be readily fitted in the same case or housing as the motor, and adds only a small amount of inertia, since the useful output voltage typically requires only a few windings and laminations. The transducer is capable of handling the same harsh conditions as the motor itself, and is insensitive to the temperature extremes created ty the motor. The transducer has no brushes, so that there are no wearing parts requiring service or replacement.

The transducer of this invention is relatively insensitive to shaft inconcentricities, since the latter are canceled by the bridge connections, as in FIG. 4. Also, the transducer can be employed with either digital or analog feedback systems for stepping motors.

We claim:

1. A rotational position transducer comprising, in combination,
    a rotor of magnetic material having annularly spaced teeth and means for attachment to a rotating driver,
    a stator having at least first and second annularly spaced stator poles and a third stator pole between said first and second poles, each pole having a winding thereon and a face comprising a plurality of annularly spaced teeth opposing the rotor teeth,
    means for connection of a first phase of an alternating voltage source to the winding on the first pole, means for connection of a second phase of the voltage source displaced from the first phase to the winding on the second pole, and
    a position detection circuit connected with the winding on the third stator pole and responsive to the phase displacement between a voltage induced therein and the voltage source.

2. A rotational position transducer comprising, in combination,
    a rotor of magnetic material having annularly spaced teeth and means for attachment to a rotating driver,
    a stator having at least first and second annularly spaced stator poles and a third stator pole between said first and second poles, each pole having a winding thereon and a face comprising a plurality of annularly spaced teeth opposing the rotor teeth, the teeth of adjacent poles progressively advancing in annular displacement relative to the rotor teeth opposed thereto,
    means for connection of a first phase of an alternating voltage source to the winding on the first pole, means for connection of a second phase of the voltage source displaced from the first phase to the winding on the second pole, and
    a position detection circuit connected with the winding on the third stator pole and responsive to a voltage component induced therein having a characteristic which varies as a function of the angular position of the rotor relative to the stator.

3. A rotational position transducer comprising, in combination,
    a rotor of magnetic material having annularly spaced teeth and means for attachment to a rotating driver,
    a stator having an integral multiple of four uniformly annularly spaced poles each having a face comprising a plurality of annularly spaced teeth opposing the rotor teeth, the teeth of adjacent poles progressively advancing in annular displacement relative to the rotor teeth opposed thereto, the stator having at least two pole windings,
    means for connection of an alternating voltage source to at least one of the pole windings, and
    a position detector circuit connected with at least one of the pole windings and responsive to a voltage component induced therein having a characteristic which varies as a function of the angular position of the rotor relative to the stator.

4. A rotational position transducer having, in combination,
    a rotor of magnetic material having annularly spaced teeth and means for attachment to a rotating driver,
    a stator having at least four poles spaced 90° apart, each having a pole winding and a face comprising a plurality of annularly spaced teeth opposing the rotor teeth, the teeth of adjacent poles progressively advancing in annular displacement relative to the rotor teeth opposed thereto, the teeth of each pole having the same annular displacement relative to the rotor teeth as the teeth of the diametrically opposite pole,
    means for connection of an alternating voltage source to at least one of the pole windings, and
    a position detection circuit comprising a pair of circuit branches connected to the voltage source in parallel, each comprising the series connected windings of two poles spaced 90° apart, said branches forming a bridge circuit responsive to a voltage component induced therein having a characteristic which varies as a function of the angular position of the rotor relative to the stator.

5. A transducer according to claim 4, in which the detection circuit is responsive to the amplitude modulation of the output voltage across the bridge circuit.

6. A transducer according to claim 4, having eight poles, the detection circuit comprising two pairs of circuit branches forming two bridge circuits, the windings of adjacent poles being connected in different bridge circuits whereby the output voltages across the bridge circuits are in phase quadrature.

7. A transducer according to claim 6, in which the detection circuit comprises
    means to convert the analog output of each bridge circuit to a digital form, and
    an addressable memory having its address bits connected to the converting means and including as many cells as there are combinations of simultaneous outputs of said converting means, each cell having digital information stored therein corresponding to the angular displacement represented by said simultaneous outputs.

* * * * *

UNITED STATES PATENT AND TRADEMARK OFFICE
CERTIFICATE OF CORRECTION

PATENT NO. : 4,772,815
DATED : September 20, 1988
INVENTOR(S) : Timothy J. Harned, et al It is certified that error appears in the above-identified patent and that said Letters Patent is hereby corrected as shown below:

In the title, "Refluctance" should read --Reluctance--

Signed and Sealed this

Seventh Day of March, 1989

*Attest:*

DONALD J. QUIGG

*Attesting Officer*  *Commissioner of Patents and Trademarks*